Jan. 21, 1958   P. E. ANDERSON ET AL   2,820,283
SPOOLHEAD COIL LEAD THREADING AND ASSEMBLING MACHINE
Filed March 30, 1954   3 Sheets-Sheet 1
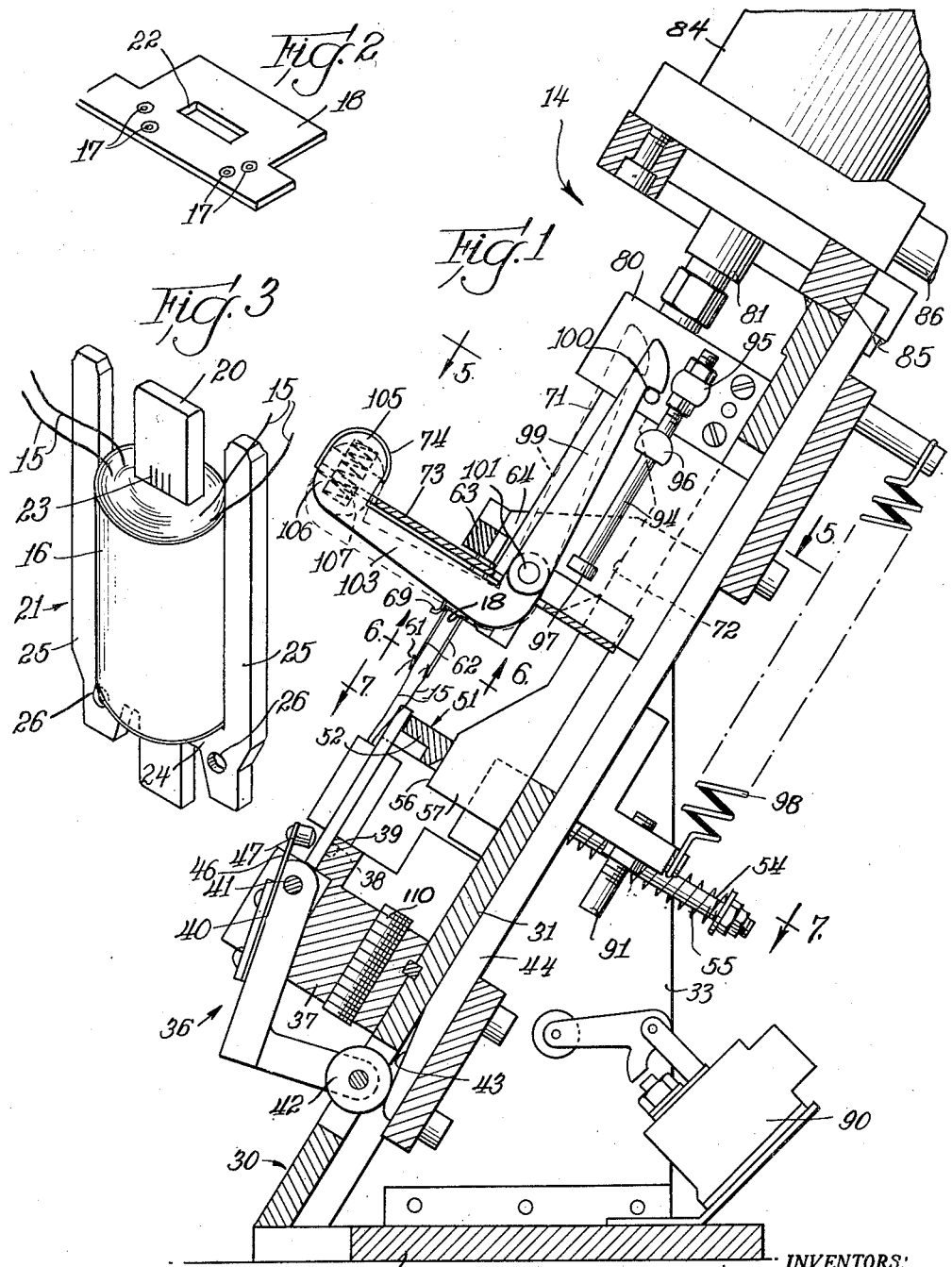
INVENTORS:
P. E. ANDERSON
H. G. CAHILL
BY
C. B. Hamilton
Atty.

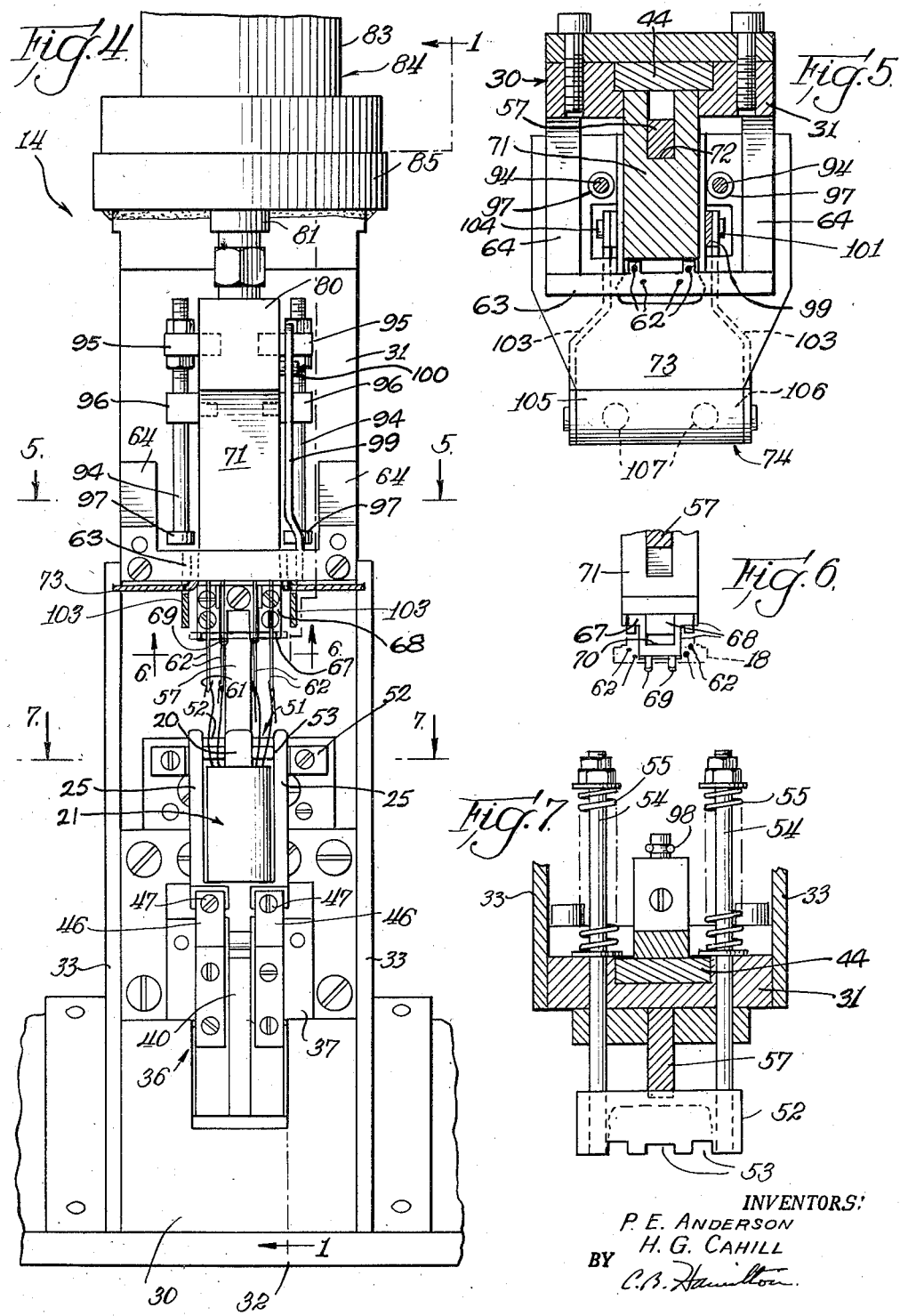

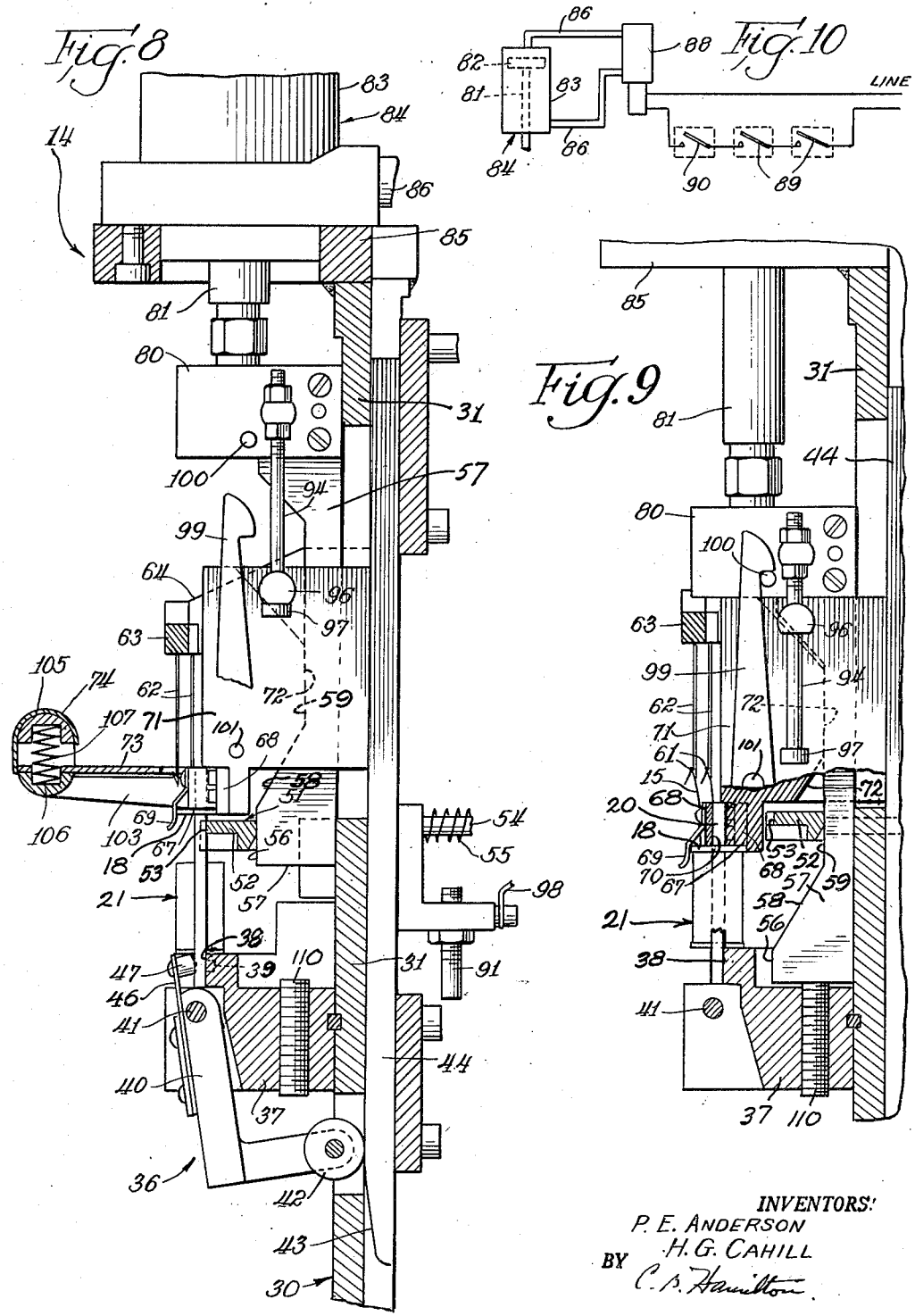

United States Patent Office 2,820,283
Patented Jan. 21, 1958

2,820,283

SPOOLHEAD COIL LEAD THREADING AND ASSEMBLING MACHINE

Paul E. Anderson, Hinsdale, and Harold G. Cahill, Riverside, Ill., assignors to Western Electric Company, Incorporated, New York, N. Y., a corporation of New York Application March 30, 1954, Serial No. 419,882

10 Claims. (Cl. 29—203)

This invention relates to a device for assembling spool heads onto relay coil assemblies and more particularly to a machine for threading the coil leads through a spool head and assembling the spool head onto the core of a relay coil component.

An object of the invention is to provide an improved device for assembling a spool head onto the core of a relay component.

Another object of the invention is to provide a device for threading the leads of a coil through eyelets of a spool head and assembling the spool head onto the core of the coil assembly.

A device illustrating certain features of the invention for threading the coil leads through a spool head and assembling the spool head onto the core of a coil assembly may include a stationary framework for supporting a plurality of hooked needles, a movable nest for supporting a spool head threaded over the needles, a stationary holder for supporting a coil assembly in the path of movement of the movable nest and in spaced relation to the hooked needles onto which the ends of the coil leads are looped, means for actuating the nest to move the spool head off of the needles and onto the core of the coil assembly to effect the threading of the coil leads through the apertured spool head, and power means for actuating the nest to force the spool head to a predetermined position on the core and into close proximity to the end of the coil.

Other objects and advantages of the invention will become aparent by reference to the following detailed description and the accompanying drawings illustrating a preferred embodiment thereof, in which Fig. 1 is a vertical sectional view of the device taken on line 1—1 of Fig. 8 and showing parts thereof in one position;

Fig. 2 is a perspective view of the spool head;

Fig. 3 is a perspective view of a relay coil and core structure onto which the spool head is to be assembled;

Fig. 4 is a face view of the device;

Fig. 5 is a cross-sectional view of the device taken along the line 5—5 of Fig. 1;

Fig. 6 is an end view of the movable nest for holding the spool head indicated by the line 6—6 of Fig. 1;

Fig. 7 is a cross-sectional view of the device taken on the line 7—7 of Fig. 1;

Fig. 8 is a fragmentary vertical sectional view of the device similar to Fig. 1 showing some of the parts in a different position and showing a portion of a handle component of the device broken away and a portion thereof in section.

Fig. 9 is a sectional view similar to Fig. 8 with parts omitted and showing some of the parts in different positions and with a portion of a pusher component of the device broken away and shown in section; and Fig. 10 is a diagrammatic view of the power actuator and the electrical control system therefor.

The present device 14 is designed to thread a plurality of terminal leads 15 of a coil 16 through eyelet holes 17 in an apertured spool head 18 and assemble the apertured spool head 18 onto the core 20 of a coil assembly 21 into engagement with the end of the coil 16. The spool head 18 (Fig. 2) has a rectangular aperture 22 for receiving the core 20 therein and the core 20 has flat knurled portions 23 on opposite faces thereof engageable with the spool head 18 for effecting a gripping engagement therewith to secure the spool head thereon. Adjacent the lower end thereof the core 20 has a laterally extending portion 24 from the ends of which extend arms 25 in parallel and spaced relation to the center core 20. A pair of projections or embossments 26 are formed in the lateral portion 24 of the core.

The device 14 has a stationary frame 30 comprising a plate 31 disposed at an angle and secured to a base plate 32 which is adapted to be secured to a table top or bench for supporting the device. Gusset pltes 33 are provided, connecting the base plate with the plates 31 and 32. A holder 36 is provided for supporting the coil assembly 21 and comprises a stationary jaw or block 37 fixed to the plate 31 and having a flat surface 38 for receiving the lateral portion 24 of the core 20 and having a pair of recesses 39 for receiving the embossments 26 thereon. The core 20 is adapted to be clamped against the stationary member 37 by means of a clamping element 40 supported on the member 37 for pivotal movement about a pin 41. The element 40 is in the form of a bell crank lever having a roller 42 which is engageable with a cam surface 43 on a slide 44 mounted for reciprocal movement on the frame 30 for actuating the clamping element. A pair of flat leaf springs 46 fastened to the bell crank lever carry clamping jaw elements 47 which are adapted to engage the core member and yieldably clamp it against the surface 38 of the holder 36 in response to actuation of the clamping element 40 to support the coiled assembly 21 in a predetermined position.

An auxiliary holder 51 is provided for supporting the other end of the coil assembly prior to the actuation of the clamping element 40. The auxiliary holder 51 comprises a bar 52 (Fig. 7) having seats 53 for receiving the core 20 and arms 25 therein. The bar 52 is supported on the ends of a pair of guide rods 54 which are mounted for sliding movement in bearing apertures in the frame plate 31 and have springs 55 thereon for urging the holder 51 for movement toward the plate 31 and against a stop surface 56 of a cam member 57. The cam member 57, which has a sloping cam surface 58 and a stop surface 59, is reciprocable to actuate the holder 51 alternately to and from its normal operative position as shown in Fig. 1 and a retracted position shown in Fig. 9.

With the coil assembly 21 in the holders 36 and 51 the leads 15 of the coil 16 may be looped over the hook ends 61 of a plurality of needles 62 fixed to a bar 63 which is supported by a pair of brackets 64 on the frame plate 31. Prior to looping the terminal leads 15 over the ends of the needles 62, the spool head 18 is threaded over the needles and seated in a nest 67 of a pusher member 68 and is yieldably held therein by a retaining spring 69. The pusher member 68 is apertured at 70 to receive the core 20 and is formed on the lower end of a block 71 which in turn is secured to the slide 44 and forms a part thereof. The block 71 is movable within the bar 63 and the brackets 64 and has a recess 72 (Figs. 5 and 8) providing clearance for the cam member 57. A plate 73 fixed to the block 71 has a handle 74, by means of which the slide 44 and the nest 67 thereon may be actuated from the position shown in Fig. 1 to the position shown in Fig. 8 to move the spool head 18 off the needles 62 and into engagement with the end portion of the core 20 and thereby effect the threading of the terminal leads 15 through the eyelet holes 17 therein.

Power means are provided for moving the slide 44 and the nest 67 from the position shown in Fig. 8 to the position shown in Fig. 9 to force the spool head 18 along the core 20 to a predetermined position thereon in engagement with the end of the coil 16. The power means comprises a plunger or head 80 in the form of a rectangular block fixed to the end of a piston rod 81 of a piston 82 (Fig. 10) mounted for reciprocation in a cylinder 83 of a fluid actuator 84. The fluid actuator 84 is supported on a portion 85 of the frame 30 and the piston 82 thereof is adapted to be reciprocated by compressed air or other fluid directed to opposite ends of the cylinder through pipelines 86 under control of a solenoid valve 88. The solenoid valve 88 is actuated in response to the closing of a pair of manually operated switches 89 and a switch 90 which is mounted on the base plate 32 and is adapted to be actuated by a pin 91 on the slide 44 (Fig. 1) in response to movement of the slide and the nest 67 to the position shown in Fig. 8. The cam member 57 for moving the auxiliary holder 51 is secured to the plunger 80 for movement therewith.

A pair of adjustable threaded rods 94 engaging threaded apertures in studs 95 fixed to the plunger 80 and passing through apertured studs 96 fixed to the blocks 71 have enlarged heads 97 thereon which are adapted to be engaged by the studs 96 for stopping the slide 44 and the nest 67 in a predetermined position (Fig. 8).

When the nest 67 and the slide 44 have been manually moved from the position shown in Fig. 1 to the position shown in Fig. 8 the switch 90 is closed by the pin 91 on the slide and the pair of manually operated switches 89 (Fig. 10) may be closed by the operator to actuate the fluid actuator 84 and cause the plunger 80 to engage the block 71 and move the slide 44, the nest 67 and the spool head 18 therein from the position shown in Fig. 8 to the position shown in Fig. 9, thus forcing the spool head along the core 20 into close proximity to the end of the coil 16. Upon release of the manually operated switches 89 the solenoid valve 88 is deenergized and the fluid actuator 84 is caused to return the plunger 80 to its original starting position.

Latching means are provided for latching the slide 44 to the plunger 80 for upward movement therewith to its normal upper position where it is yieldably maintained by a spring 98. The latch means comprises a latch member 99 having a hooked upper end adapted to engage a pin 100 fixed to the plunger 80. The latch 99 is pivotally supported on a pin 101 on the block 71 and is secured to one end of one of a pair of levers 103 pivotally supported on the pivot pin 101 and a similar pin 104 on opposite sides of the block 71. The opposite ends of the levers 103 are connected to a member 105 forming one component of the composite handle 74. The handle member 105 is positioned above and is movable relative to a member 106 fixed to the plate 73 and forming another component of the handle 74, and a pair of springs 107 positioned between the members 105 and 106 serve to yieldably hold them in separated position and hold the latch 99 in engagement with the pin 100.

With the parts of the device in the position shown in Fig. 1 a spool head 18 may be threaded over the needles 62 and seated in the nest 67, and a coil assembly 21 may be placed in the holder 36 and the auxiliary holder 51 as indicated in Fig. 1, after which the terminal leads 15 of the coil may be looped about the hooked ends of the needles 62. The movable member 105 of the handle 74 may be engaged and moved downwardly to manually move the slide 44 and the nest 67 with the spool head 18 therein downwardly from the position shown in Fig. 1 to the position shown in Fig. 8 to carry the spool head 18 off of the needles 62 into engagement with the upper end of the core 20 and cause the terminal leads 18 to be threaded through the eyelet holes 17. The movement of the slide 44 from the position shown in Fig. 1 to the position shown in Fig. 2 actuates the clamping element 40 to clamp the lower portion of the core 20 and thus support the coil assembly 21. The manually operated switches 89 (Fig. 10) may then be closed to cause the power actuator to move the slide 44, nest 67, and the spool head 18 therein from the position shown in Fig. 8 to that shown in Fig. 9 to force the spool head 18 along the core to a predetermined position thereon adjacent the coil 16. As the plunger 80 moves downwardly the cam member 57 is moved therewith and during the first portion of the downward movement thereof the cam and springs 55 effect the movement of the auxiliary holder 51 from the core 20 on the coil assembly 21 to the position shown in Fig. 9 to provide clearance for the movement of the pusher member 68 and the spool head 18. A stop 110 in the stationary member 37 engages the end of the cam member 57 to arrest the downward movement of the slide 44 and the spool head 18 to a predetermined position.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. A device for assembling a spool head onto a core of a coil assembly comprising a stationary frame, a plurality of hooked needles fixedly mounted on said frame in parallel relation to each other for supporting the lead wires from said coil assembly, a pusher member slidably mounted on said frame for movement parallel to said needles and having means for supporting a spool head which has been threaded on the needles, a holder on said frame for supporting a coil assembly in the path of movement of said pusher member to receive the spool head carried by said pusher member, means for actuating said pusher member to a first position for receiving and supporting a spool head which has been threaded on the needles, means for actuating said pusher member to a second position to effect the movement of the spool head off of the needles and into engagement with the end of the core of the coil assembly and to effect the threading of said lead wires through said spool head, and means mounted on said frame for moving the pusher member from said second position to a third position to push the spool head to a predetermined position on the core.

2. A device for assembling a spool head onto the core of a coil assembly comprising a stationary frame, a slide movable on said frame, a plurality of hooked needles for supporting the terminal wires of said coil assembly, means on said frame for supporting said needles in a predetermined fixed position in parallel relation to each other and to the movement of said slide, a pusher member on said slide having a nest for supporting a spool head which has been threaded on the needles for movement with the slide through a predetermined path parallel to the needles, said pusher member having a first position for receiving and supporting a spool head which has been threaded on the needles, a holder on said frame for supporting a coil assembly in the path of movement of said pusher member to receive the spool head carried thereby, means for actuating said slide from said first position to a second position to effect the movement of the spool head off of the needles and into engagement with the end of the core of the coil assembly and the threading of said terminal wires through said spool head, and means for moving the pusher member from the second position to a third position to push the spool head to a predetermined position on the core.

3. A device for assembling a spool head onto the core of a coil assembly comprising a stationary frame, a slide movable on said frame, a plurality of hooked needles for supporting the terminal wires from said coil assembly, means on said frame for supporting said needles in a predetermined fixed position parallel to the movement of said slide, a pusher member on said slide having means for supporting a spool head therein for movement with the slide through a predetermined path parallel to the needles, said pusher member having a first position for receiving and supporting a spool head which has been threaded on the needles, a holder on said frame for supporting a coil assembly in the path of movement of said pusher member to receive the spool head carried thereby, means for manually actuating said slide from said first position to a second position to effect the movement of the spool head off of the needles and into engagement with the end of the core of the coil assembly and the threading of said terminal wires through said spool head, and power actuated means mounted on said frame for moving the pusher member from the second position to a third position to push the spool head to a predetermined position on the core.

4. A device as defined in claim 3 including control means having a manually actuated switch and a switch actuated in response to the movement of said pusher member to said second position for actuating said power actuated means.

5. A device for assembling a spool head onto the core of a coil assembly comprising a stationary frame, a plurality of hooked needles fixedly mounted on said frame in parallel relation to each other for supporting the terminal wires from the coil assembly, a pusher member having a nest for supporting a spool head, means on said frame for mounting said pusher member for movement parallel to the needles, said pusher member having a first position for receiving and supporting a spool head which has been threaded on the needles, a holder on said frame for supporting said coil assembly with the core thereof in the path of movement of said pusher member to receive the spool head carried thereby, means for manually actuating the pusher member from said first position to a second position to carry the spool head off of the needles to a second position in engagement with the end of the core of said coil assembly to effect the threading of said terminal wires through the spool head, a power actuating means mounted on said frame and including a reciprocable plunger engageable with said pusher member for moving the pusher member from said second position to a third position to push the spool head to a predetermined position on the core, and means for latching the pusher member to said plunger during the return movement of said plunger for effecting the return movement of the pusher member to said first position.

6. A device for assembling a spool head onto the core of a coil assembly comprising a stationary frame, a plurality of hooked needles fixedly mounted on said frame in parallel relation to each other for supporting the terminal wires from the coil of said coil assembly, a pusher member having a nest for yieldably supporting a spool head, means on the frame for mounting said pusher member for movement parallel to the needles, said pusher member having a first position for receiving and supporting a spool head which has been threaded on the needles, a holder on said frame for supporting said coil assembly with the core thereof in the path of movement of said pusher member to receive the spool head carried thereby, a handle on said pusher member for moving it from said first position to a second position to carry the spool head off of the needles into engagement with the end of the core of said coil assembly to effect the threading of said terminal wires through the spool head, a power actuating means mounted on said frame and including a reciprocable plunger engageable with said pusher member for moving the pusher member from said second position to a third position to push the spool head to a predetermined position on the core, means on the pusher member for latching the pusher member to said plunger for effecting the return movement of the pusher member to said first position in response to the return movement of said plunger, and means cooperating with said handle for actuating the latching means to release the pusher member.

7. A device for assembling a spool head onto the core of a coil assembly comprising a stationary frame, a plurality of hooked needles fixedly mounted on said frame in parallel relation to each other for supporting the terminal wires from the coil of said coil assembly, a pusher member having a nest for yieldably supporting a spool head, means on said frame for mounting said pusher member for movement parallel to the needles, said pusher member having a first position for receiving and supporting a spool head which has been threaded on the needles, a holder on said frame for supporting said coil assembly with the core thereof in the path of movement of said pusher member to receive the spool head carried thereby, means for manually moving the pusher member from a first position to a second position to carry the spool head off of the needles into engagement with the end of the core of said coil assembly to effect the threading of the terminal wires through the spool head, power actuating means mounted on the frame and including a reciprocable plunger engageable with said pusher member for moving the pusher member from said second position to a third position to push the spool head to a predetermined position on the core, control means having a manually actuated switch and a switch actuated in response to movement of said pusher member to said second position for actuating said power actuating means, and means on the pusher member for latching the pusher member to said plunger for effecting the return movement of the pusher member to said first position in response to the return movement of said plunger.

8. A device for assembling a spool head onto the core of a coil assembly comprising a stationary frame, a slide movable on said frame, a plurality of hooked needles for supporting the terminal wires from said coil assembly, means on said frame for fixedly supporting said needles in a predetermined position in parallel relation to each other, a pusher member mounted fixedly on said slide and having a nest for supporting a spool head therein for movement with the slide through a path parallel to the needles, said pusher member having a first position for receiving and supporting a spool head which has been threaded on the needles, a stationary supporting member on said frame having a seat engageable with the end of the core, a movable clamping member pivotally supported on said frame for clamping the end of the core against said stationary member for supporting the coil assembly in the path of said pusher member to receive the spool head carried thereby, a cam on said slide for actuating the movable clamping member, a holding element engageable with the other end of said core, cam means on the slide for moving said holding element transversely of the movement of said pusher member to and from a normal position for supporting the other end of the core in the path of movement of said pusher, a handle on said pusher member for moving it from said first position to a second position to effect the movement of the spool head off of the needles into engagement with the end of the core of said coil assembly and the threading of said terminal wires through said spool head, power actuated means mounted on the frame for moving the pusher member from a second position to a third position to push the spool head to a predetermined position on the core, and cam means mounted on the slide for actuating said holding element to effect the movement of the holding element from said normal position to provide clearance for the movement of the pusher member as it presses the spool head onto the core.

9. A device for assembling a spool head onto the core of a coil assembly comprising a stationary frame including a sloping plate, a slide supported on said plate for reciprocable movement along an oblique path, a plurality of hooked needles for supporting the terminal wires from said coil assembly, means on said plate for supporting said needles in a predetermined position parallel to the movement of said slide, a pusher member mounted fixedly on said slide having a nest for supporting a spool head therein for movement relative to the needles, said pusher member having a first position for receiving and supporting a spool head which has been threaded on the needles, a stationary jaw on said plate having a seat engageable with one end portion of the core, a movable jaw supported on said frame for clamping said one end portion of the core against said stationary jaw to support the coil assembly in the path of the pusher member to receive the spool head carried thereby, means on the slide for actuating said movable clamping jaw in timed relation to the movement of said pusher member, an element engageable with the other end of said core, means on the frame for guiding said element for movement transversely of the movement of said pusher member to and from a normal position for supporting the other end of the core in the path of movement of said pusher, a handle on said pusher member for moving it from said first position to a second position to effect the movement of the spool head off of the needles and into engagement with the end of the core of said coil assembly and the threading of said terminal wires through said spool head, power actuated means on the frame for moving the pusher member from a second position to a third position to push the spool head to a predetermined position on the core, and means on the slide for actuating said element in timed relation to said power actuated means to effect the movement of said element from said normal position to provide clearance for the movement of the pusher member as it presses the spool head onto the core.

10. In a device for assembling an apertured spool head onto a core of a coil assembly having lead wires, a stationary frame, a plurality of hooked needles fixedly mounted on said frame in spaced parallel relation to each other for supporting the lead wires from said coil assembly, a pusher member slidably mounted on said frame for movement parallel to said needles, means on said pusher member for supporting a spool head for movement therewith, a holder on said frame for supporting a coil assembly in the path of movement of said pusher member and in alignment with said needles to receive the spool head carried by said pusher member, said pusher member having a first position for receiving and supporting a spool head which has been threaded on the needles and being manually movable from said first position to a second position to move the spool head off of the needles into engagement with the end of the core of the coil assembly to effect the threading of said lead wires through said spool head, and means mounted on the frame for moving the pusher member from said second position to a third position to push the spool head to a predetermined position on the core.

References Cited in the file of this patent
UNITED STATES PATENTS

| | | |
|---|---|---|
| 2,390,139 | Vasselli | Dec. 4, 1945 |
| 2,593,081 | Wilmot | Apr. 15, 1952 |
| 2,644,998 | Klinkert | July 14, 1953 |
| 2,686,357 | Weisberg | Aug. 17, 1954 |